Oct. 26, 1965   D. J. BROWN   3,214,748
FIRE ALARM APPARATUS AND SYSTEMS
Filed Jan. 28, 1959   10 Sheets-Sheet 1

INVENTOR
DONALD J. BROWN
BY
Strauch, Nolan & Neale
ATTORNEYS

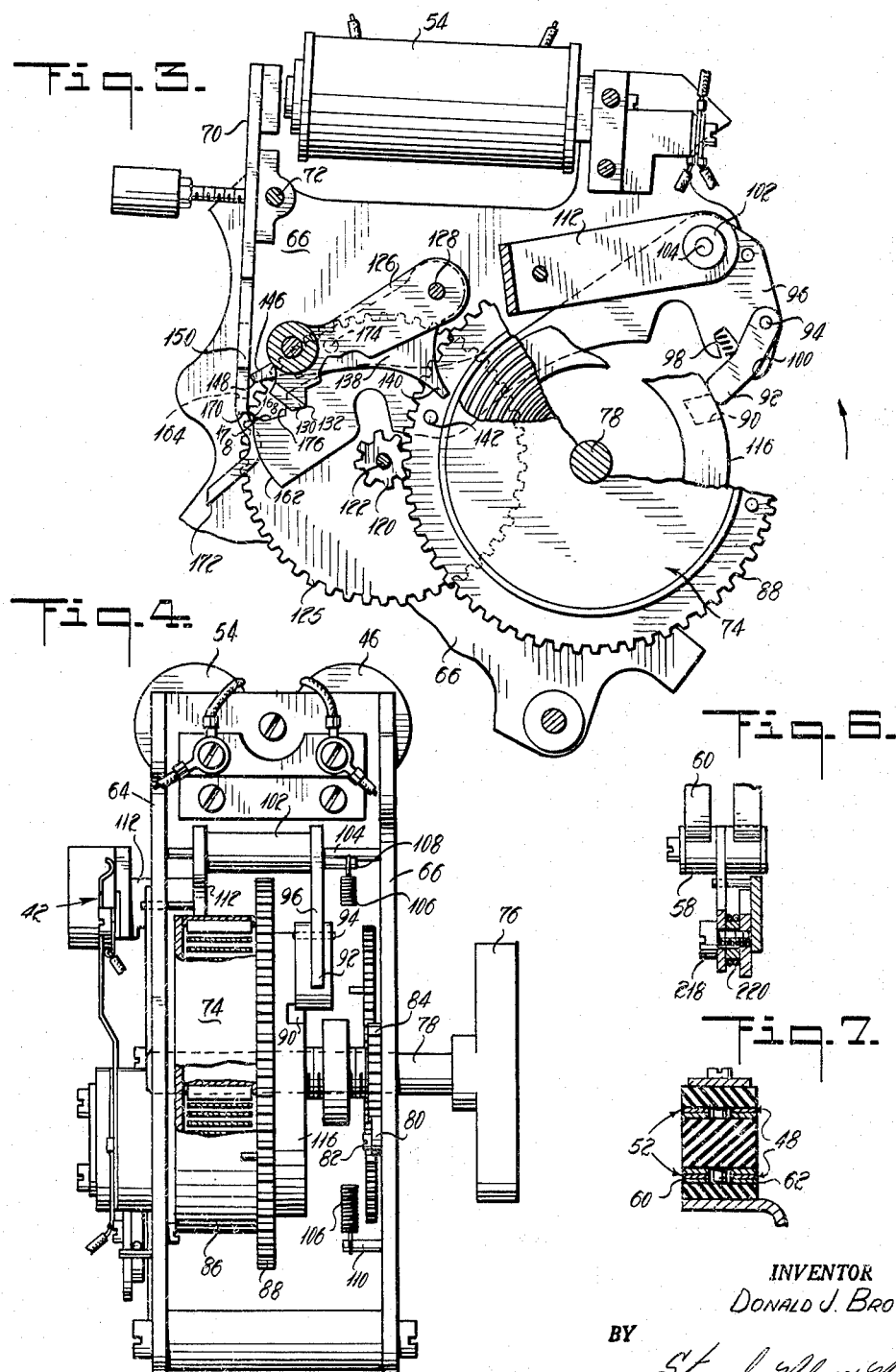

Oct. 26, 1965  D. J. BROWN  3,214,748
FIRE ALARM APPARATUS AND SYSTEMS
Filed Jan. 28, 1959  10 Sheets-Sheet 3

INVENTOR
Donald J. Brown
BY
*Strauch, Nolan & Neale*
ATTORNEYS

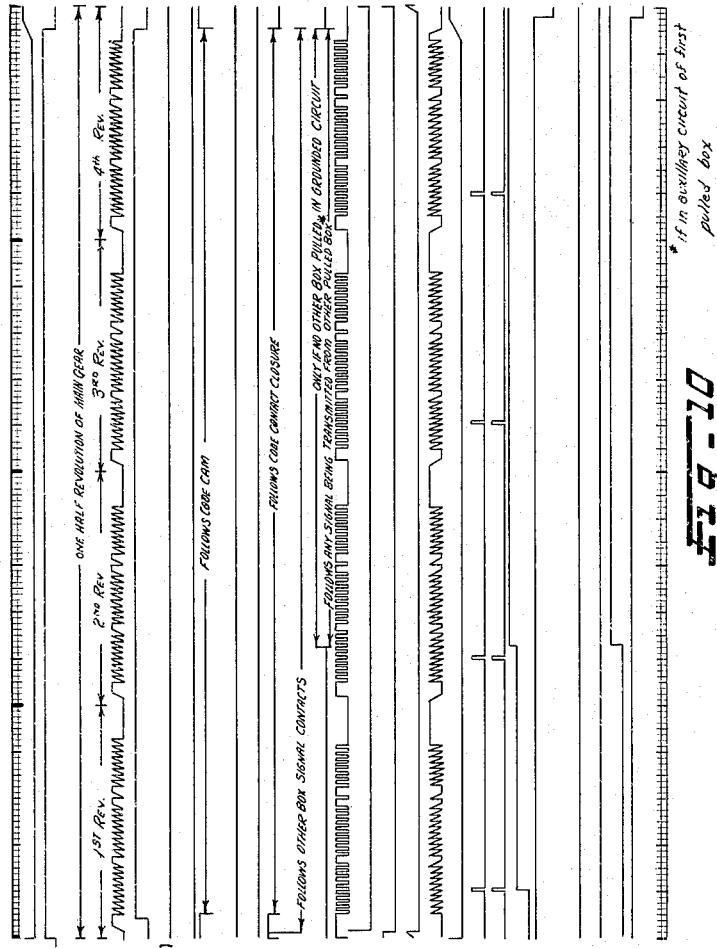

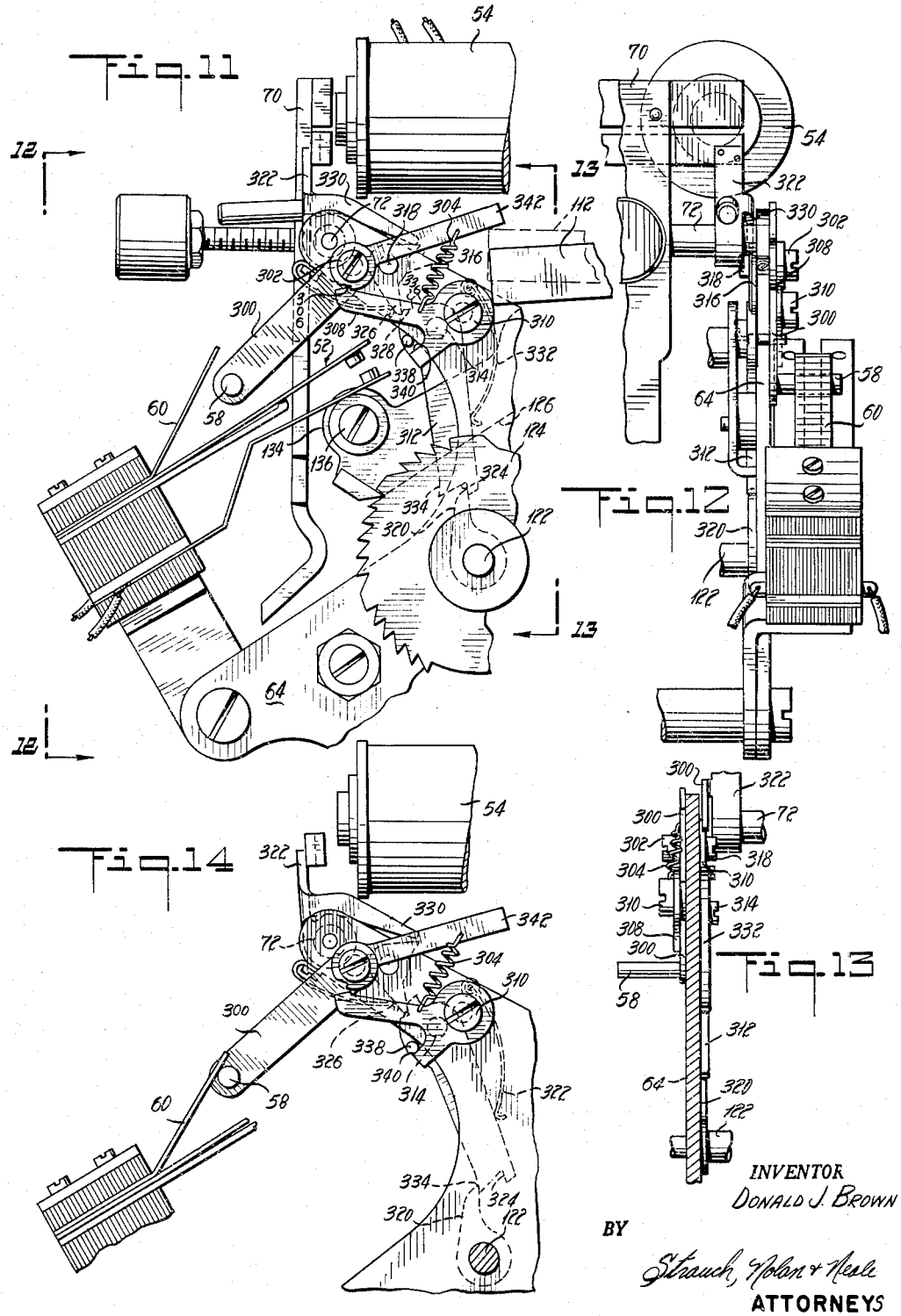

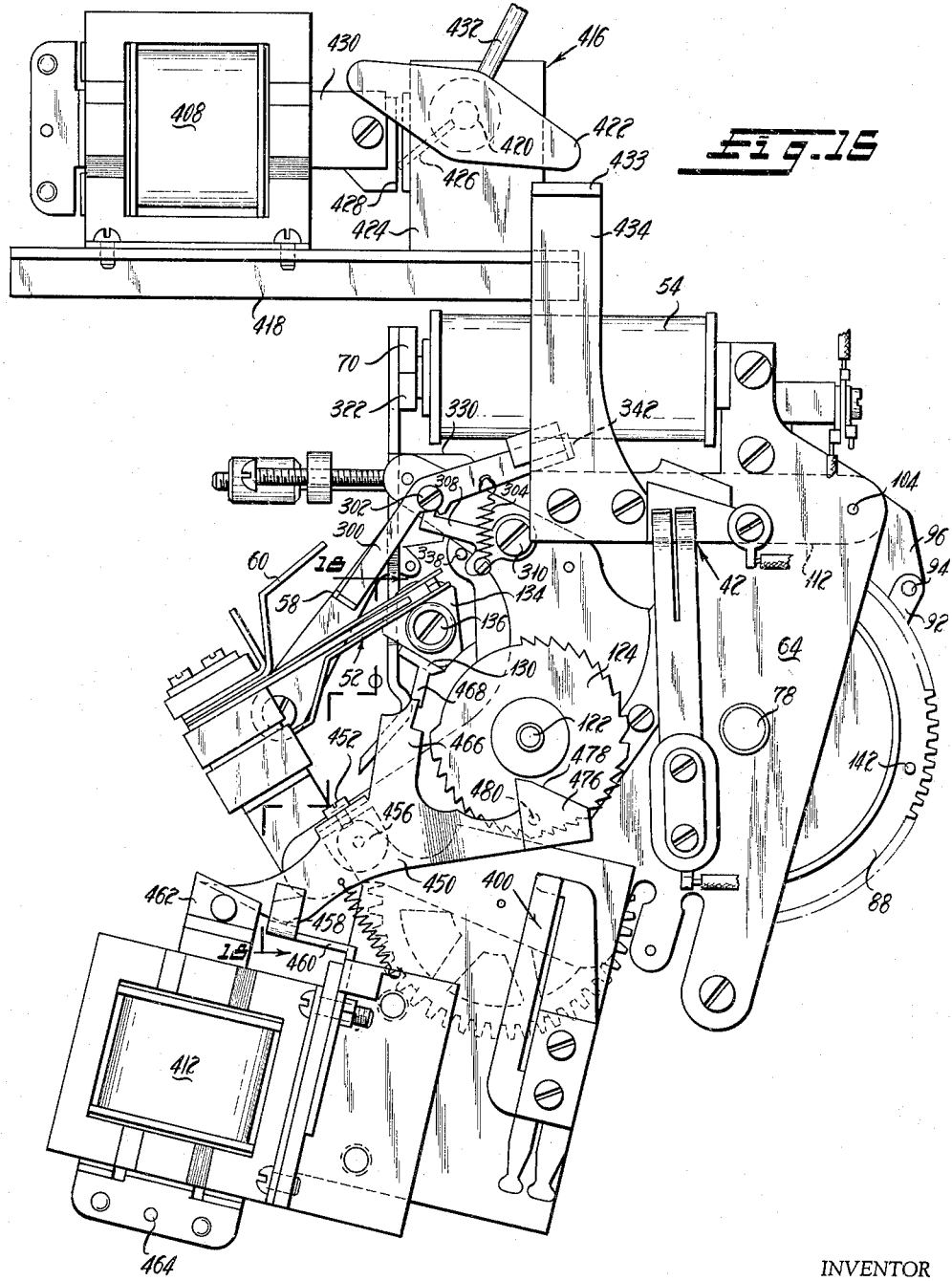

Oct. 26, 1965    D. J. BROWN    3,214,748
FIRE ALARM APPARATUS AND SYSTEMS
Filed Jan. 28, 1959    10 Sheets-Sheet 7
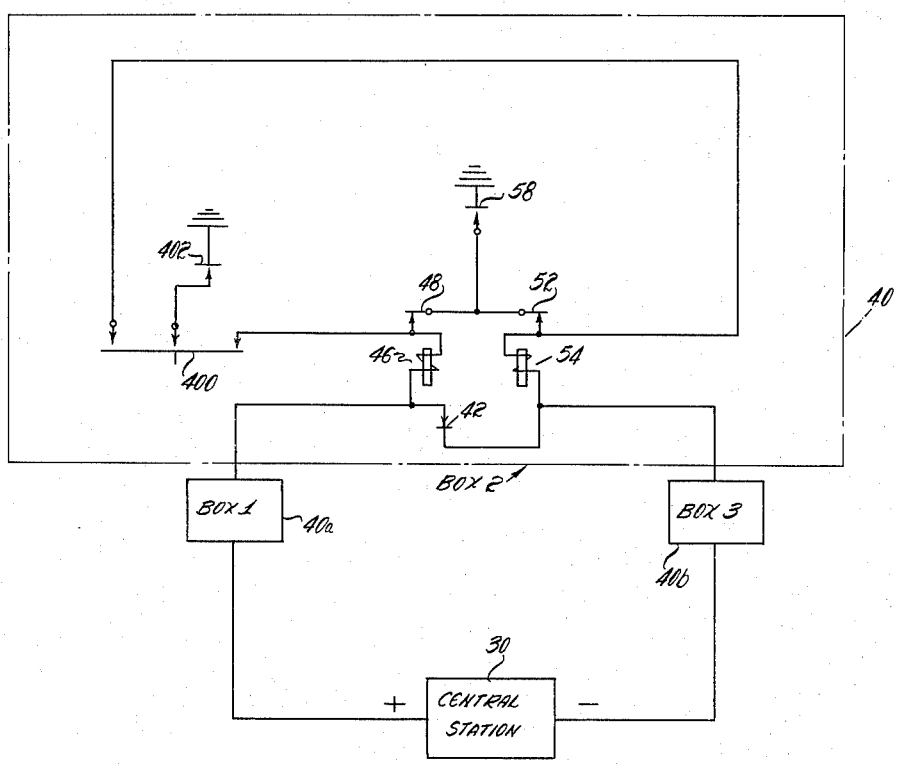
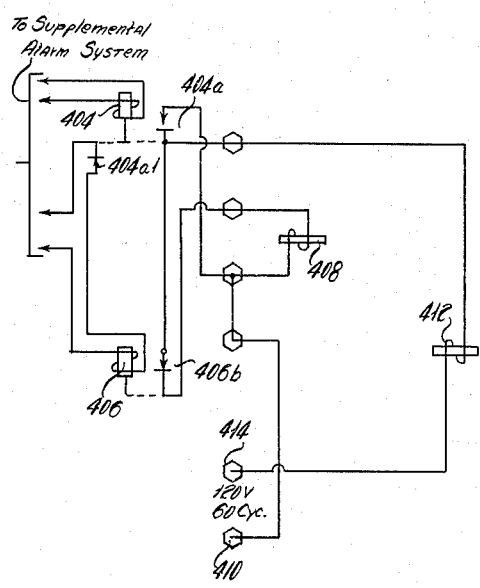
INVENTOR
DONALD J. BROWN
BY
ATTORNEYS

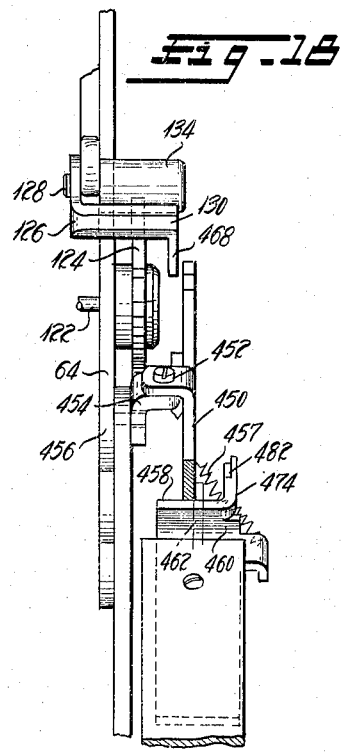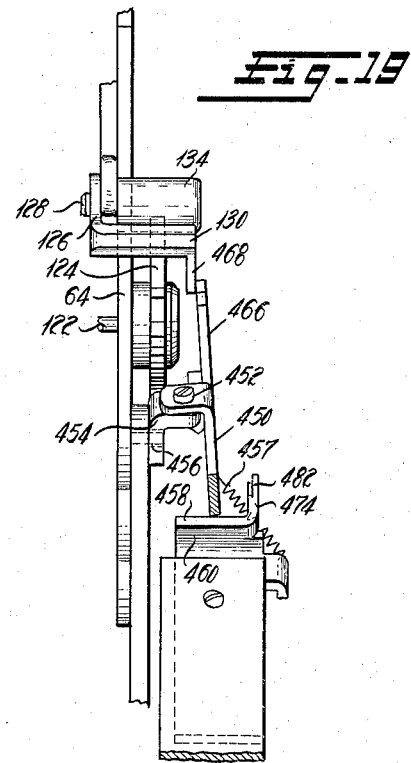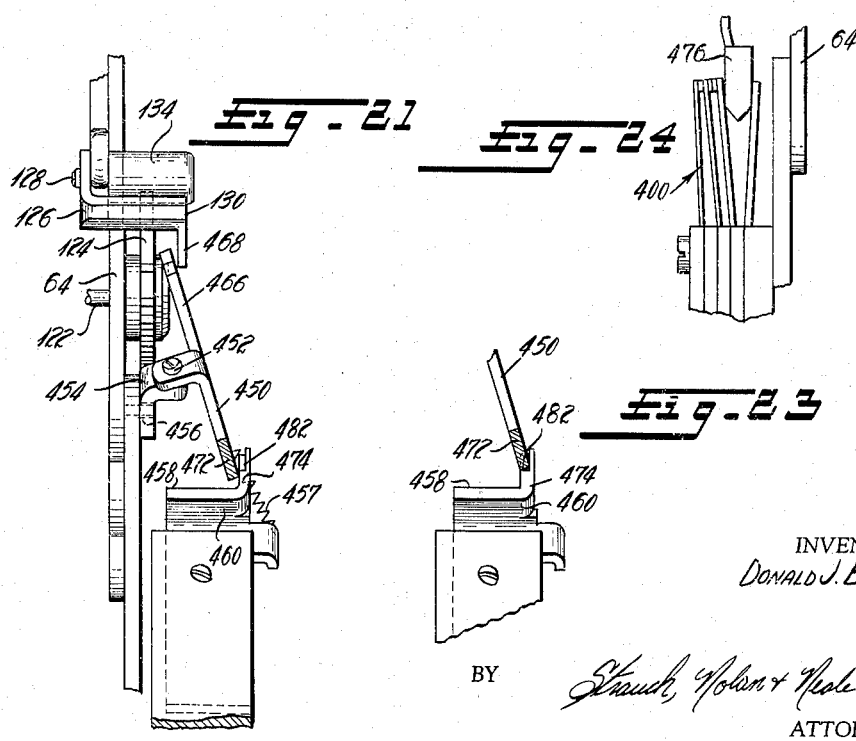

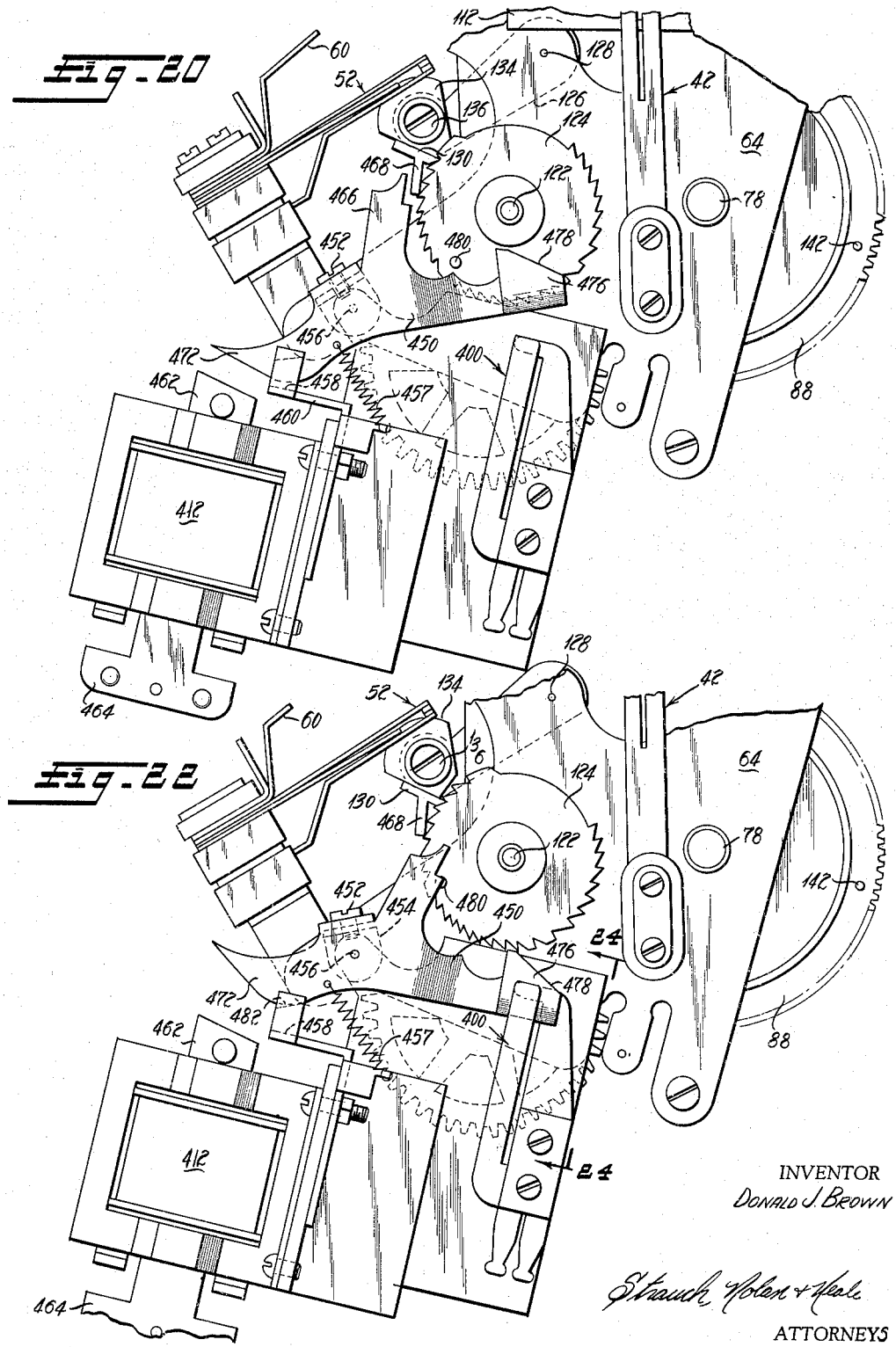

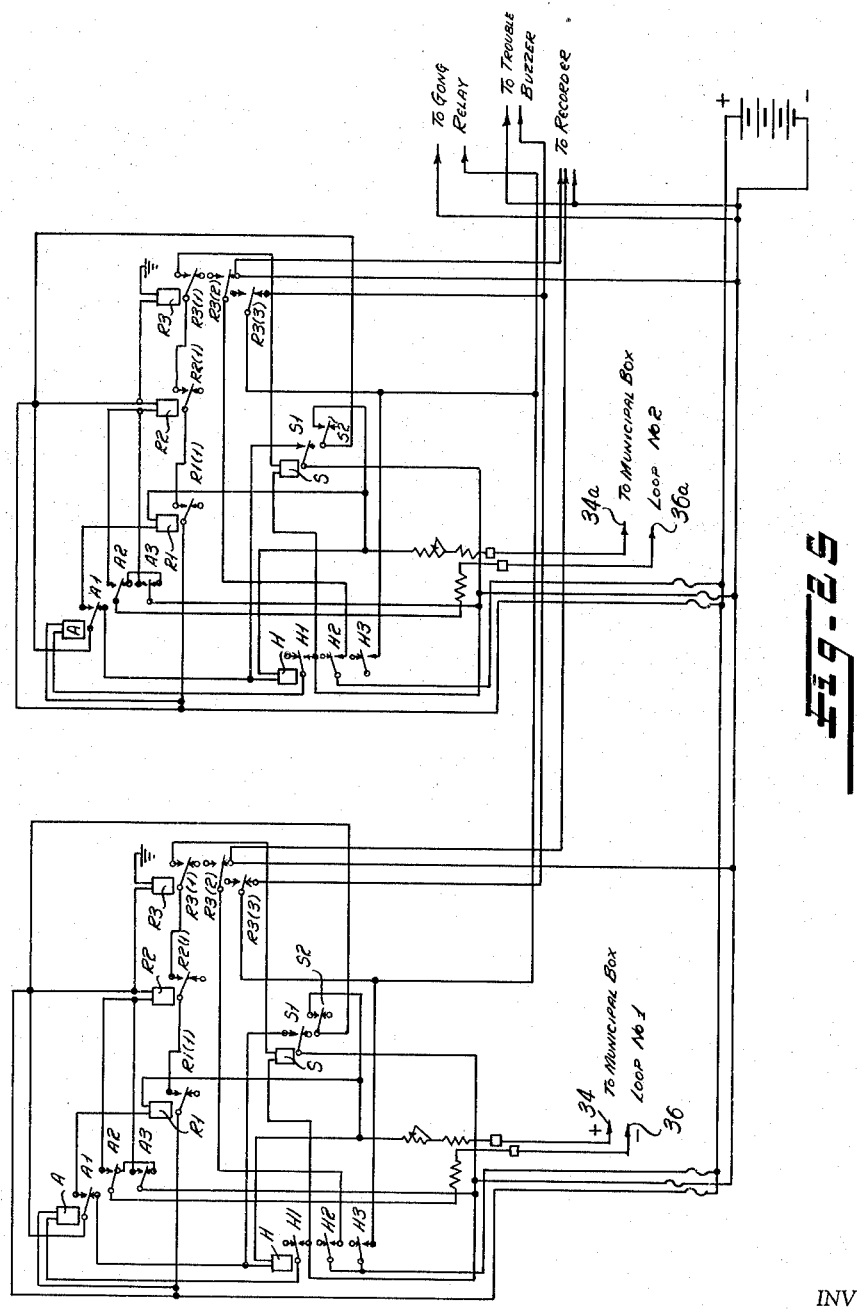

United States Patent Office 3,214,748
Patented Oct. 26, 1965

3,214,748
FIRE ALARM APPARATUS AND SYSTEMS
Donald J. Brown, Bronxville, N.Y., assignor of one-third each to Anthony W. Brown and Arthur J. Brown, both of New York, N.Y.
Filed Jan. 28, 1959, Ser. No. 792,246
16 Claims. (Cl. 340—295)

The present invention relates to improvements in fire alarm apparatus and systems.

As is well known, a municipal fire alarm circuit normally consists of a series electrical circuit or loop extending from one side of a D.C. power source, located at a central station with a recorder and alarm, through a plurality of signal boxes located throughout the municipality in series and back to the other side of the central office power source. Normally a maximum of 40 boxes are connected to any one loop. Each box is provided with a shunt switch which is normally connected in series in the loop circuit and which is closed until the box is pulled for the purpose of transmitting a fire alarm. In addition each box also contains a pair of cam actuated signalling contacts connected in parallel with the shunt switch. Until the box is pulled, the signalling contacts are shunted by the box shunt switch. When the box is pulled and the box shunt switch opened, the signalling contacts are connected in series in the circuit loop to the central station power source. Under normal conditions when a box is pulled, cam actuation of the signalling contacts will transmit a coded signal in the form of a series of circuit interruptions to the central station to actuate the alarm and recorder. Boxes are normally arranged so that if one box in the circuit has been pulled and is transmitting, the pulling of a second box in the same circuit will not interfere with the transmission of the signal by the first pulled box and signal transmission by the second pulled box will be delayed until the completion of the signalling cycle of the first box. This is known as non-interfering succession operation of a fire alarm box.

In addition and as a further safety measure, some boxes are designed to detect a break in the series loop circuit to the central station, to automatically establish a ground at the box when the box is pulled and a circuit break is detected, and to transmit a signal to the central station through ground and over the unbroken portion of the loop circuit after a ground has been established at the central station. In all but the most complicated known boxes of this type, a part of the normal series of signal groups is lost because the transmitting box begins to transmit as soon as the auxiliary circuit is established and stops at the end of the cycle in which the ground was established. Also the establishment of the central station ground heretofore has generally been effected manually with resultant loss of at least a further portion and possibly all of the alarm signal from the self grounded transmitting box because the known self grounding central station systems have had no automatic system for removal of the ground following repair of the circuit break. It is also important in order to prevent loss of signals that the box also operate non-interfering succession over the auxiliary line as well as over the normal line. Otherwise, if a box has been pulled and is signalling in the half of the loop betwen the break and the central station in which a second box is pulled, the pulling of the second box will either mutilate the signal of the first pulled box as the result of two transmitters operating simultaneously over the same channel or have its own signal lost in whole or in part as a result of the ground on the transmitting box depending upon whether it is between the central station and the first pulled box or the first pulled box is between the central station and the second pulled box. While fire alarm signalling boxes heretofore known have operated non-interfering succession over the normal circuit they have not operated non-interfering succession over an emergency established ground or auxiliary line following detection of a circuit break.

Further, while from the point of view of transmitting a fire alarm to the fire station as rapidly as possible it is desirable to permit interconnection of local private fire alarm systems installed in buildings and the like with the municipal system, such interconnections are normally not permitted due to the frequency in which false fire alarms are transmitted as a result of circuit difficulties in the private system and when they are permitted, only mechanical interconnection may be made to a standard type of fire alarm box electrically connected in the municipal circuit under the existing municipal regulations in this country. Even under these limitations however a power failure in the private circuit in prior systems will result in the transmission of a false fire alarm over the municipal system.

The primary object of this invention is to provide an improved fire alarm system and apparatus which eliminates the foregoing difficulties and assures complete and accurate transmission of all true fire alarm signals resulting from direct actuation of a transmitter on the circuit and all and only true fire alarm signals resulting from remote actuation of a transmitter in the circuit from a private interconnected system.

A more specific object of this invention is to provide an improved primary fire alarm system adapted to permit interconnection of a private fire alarm system to a transmitter or box thereof and which is automatically operative to establish an auxiliary communication circuit between the primary system central station and such transmitter in the event of a break in the normal communication channel of the primary system and to detect a circuit difficulty in the private system and transmit a trouble indicative signal distinct from all normal fire alarm signals over the auxiliary channel to the central station in non-interfering succession relation to all other transmitters in the auxiliary channel.

It is a further object of this invention to provide improved fire alarm apparatus and system which is automatically operative to establish a complete auxiliary signal transmission circuit in the event of a break in the normal signal loop over which all signals by each transmitter are transmitted in non-interfering succession relation and which is operative when interconnected with a private fire alarm system to transmit a private circuit trouble indicative signal which is distinct from a fire alarm indicative signal.

A further object of this invention is to provide an improved fire alarm apparatus and system which is automatically operative to establish a complete auxiliary signal transmission circuit in the event of a break in the normal signal loop.

A further object of this invention is to provide a fire alarm transmitter which is operative to detect a circuit break in the normal signal loop to automatically establish a connection to an auxiliary transmission circuit and to transmit fire alarm signals in non-interfering succession over the auxiliary circuit as well as over the normal circuit.

A further object of this invention is to provide an improved fire alarm system embodying a central station circuit which is operative to detect a line break and to automatically ground one side of the central station D.C. power source and connect both sides of the normal loop circuit to the other side of the power source with the central office recorder and alarm in operative relation to each side to eliminate the time delay inherent in manual central station grounding so that no signal will be lost or mutilated as a result of the delay in grounding and which is automatically operative to remove the central station ground and reestablish the normal central station circuit upon elimination of the circuit break.

A further object of this invention is therefore to provide a novel fire alarm apparatus for use in a municipal system which is provided with an electrically actuated mechanical interconnecting mechanism which adapts the box for actuation by a private fire alarm system and which is operative to distinguish between a true fire alarm in the private system and a power failure or other circuit difficulty initiated signal in the private system and to transmit a signal in the municipal system which is distinct from a fire alarm signal so that the municipal central station will not be burdened with the expense and annoyance of responding to a fire alarm signal which is a false alarm due to circuit difficulties in an interconnected private system.

These and other objects of the present invention will become more fully apparent by reference to the appended claims and as the following detailed description proceeds in reference to the accompanying drawings wherein:

FIGURE 3 is a sectional view taken along the line 3—3 of FIGURE 2; certain parts being broken away to show underlying structure;

FIGURE 4 is a view of the apparatus of FIGURE 1 as seen from the right, certain parts being broken away to show underlying structure;

FIG. 6 is a section taken along the line 6—6 of FIG. 1;

FIG. 7 is a section taken along the lines 7—7 of FIG. 1;

FIG. 10 is a timing chart illustrating in general the relation of time of operation of various components of the fire alarm transmitter apparatus several embodiments herein disclosed;

FIG. 11 is a fragmentary side elevation of a noninterfering succession fire alarm signalling apparatus constituting a second embodiment of the invention;

FIG. 12 is a view taken along the line 12—12 of FIG. 11;

FIG. 13 is a view taken along the line 13—13 of FIG. 11;

FIG. 14 is a fragmentary view showing parts of the grounding assembly in grounded position;

FIG. 15 is a side elevation view of a fire alarm transmitter similar to the embodiment of FIGS. 11–14 but adapted for actuation and control by a private fire alarm system;

FIG. 16 is a circuit diagram illustrating the interconnection of the transmitter of FIG. 15 in a municipal loop circuit;

FIG. 17 is a circuit diagram illustrating the interconnection of the transmitter of FIG. 15 with a private fire alarm system for control and actuation thereby;

FIG. 18 is a fragmentary sectional view along the line 18—18 of FIG. 15;

FIG. 19 is a view similar to FIG. 18 illustrating the first stage of actuation of the trouble signal mechanism;

FIGS. 20 and 21 are views similar to FIGS. 15 and 18 respectively illustrating the second stage of actuation of the trouble signal mechanism;

FIGS. 22 and 23 are views similar to FIGS. 15 and 18 respectively illustrating the third stage of actuation of the trouble signal mechanism;

FIG. 24 is a fragmentary sectional view along the line 24—24 of FIG. 22, and

FIG. 25 is a circuit diagram of a central station circuit in accord with the present invention providing for automatic establishment and disestablishment of auxiliary signal loops in the event of and upon repair of a break in the normal signal circuit loop respectively.

*First embodiment*

Figure 9:
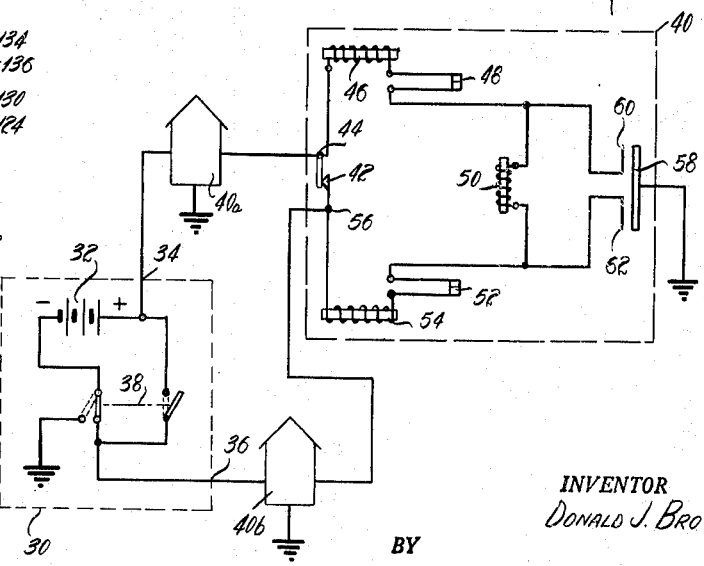
FIG. 9 is a diagram illustrating the electrical system of the apparatus.

Referring first to FIGURE 9, in which a municipal loop circuit is generally illustrated, the mechanical loop circuit includes a central station 30 having a D.C. power source 32 such as a battery, an alarm and recorder (not shown), and a pair of output terminals 34 and 36 normally connected to opposite sides of the power source 32 as illustrated and selectively connectable by actuation of switch assembly 38 so that both terminals 34 and 36 are connected to a single side of power source 32 and so that the opposite side of power source 32 is connected to ground. The output terminals 34 and 36 are connected to an external series loop circuit having a plurality of substantially identical signalling boxes of fire alarm transmitters 40, 40a and 40b connected in series and located throuthout an area of a municipality. Each box is provided with a shunt contact or switch 42 which, as is illustrated, is closed, so long as the box has not been pulled to transmit an alarm signal. Thus, in the normal condition of the loop, current flows from the terminal 34 in series through the closed shunt contacts 42 of each box 40 in the loop circuit to the terminal 36 and the opposite side of the power source 32. When a box such as 40 is pulled, the shunt contact 42 of the box is opened and the internal electrical circuit of that particular box is connected in series in the municipal loop circuit.

Before proceeding with a detailed explanation of the mechanical operation of each transmitter, it is believed desirable to describe briefly the general operation of the boxes in relation to the loop circuit. In the embodiment illustrated in FIGURE 9, the internal box circuit comprises an input terminal 44, a magnet coil 46, a pair of contacts 48, a magnet coil 50, a pair of contacts 52, a magnet coil 54 and a terminal 56 all connected in series as shown and in parallel to the shunt contacts 42, which are connected directly across the terminals 44 and 56. Contacts 48 and 52 are normally spring-biased to their open position but are mechanically held in their closed position when the box 40 is at rest. Contacts 48 and 52 are cam-actuated signalling contacts. Coils 46 and 54 are the coils of the non-interference magnets. Coil 50 is the coil of the box self-grounding mechanism, which controls the movement of a shunt bar 58 relative to contacts 60 and 62 and which is connected to ground, as shown. Non-interference magnets 46 and 54 are provided with an armature, which under signal transmitting conditions is normally alternately attracted when the contacts 48 and 52 are closed under control of a code wheel signalling cam and mechanically held within the effective field of attraction of the coils 46 and 54 when the contacts 48 and 52 are open. Thus during normal signalling operations, the armature associated with non-interference magnets 46 and 54 shifts back and forth between its attracted position and its so-called portative position in the range of influence of the coils 46 and 54 in accord with the coding of the code wheel controlling the signalling contacts 48 and 52.

If when one of the boxes 40 is pulled, a second box is already signalling, an open circuit condition will occur due to opening of the code contacts of the signalling box before the contacts 48 and 52 of the second pulled box would normally open. This will result in dropping of the armature of the second pulled box to a position in which it is beyond the effective range of attraction of the associated non-interference coils 46 and 54 and locking of the contacts 48 and 52 of the associated box in their closed position for a complete signalling cycle of the second pulled box. This prevents interference by the second pulled box with the signal transmission by the first pulled box. At the completion of the first cycle of the second pulled box, the armature of that box will again be mechanically pushed into the range of attraction of the non-interference coils 46 and 54. If the first pulled box has completed its signalling operation, the armature of the second pulled box will be magnetically attracted by the coils 46 and 54 as a result of the current flowing through them and through the mechanically closed signalling contacts 48 and 52 of that box. If the first pulled box is still signalling, the armature associated with the non-interference magnets of the second pulled box will not be attracted by the non-interference magnets 46 and 54 due to the opening of the circuit by signalling contacts of the first pulled box and the second pulled box non-interference magnet armature will again drop to a position beyond the field of influence of the associated non-interference magnet coils 46 and 54 for a second cycle. This line testing operation will take place at the beginning of each cycle of the second pulled box until the first pulled box has completed its signalling operation. When the second pulled box reaches the beginning of one of its cycles following completion of signalling by the first pulled box, it will take over and begin its normal signalling operation cycle. The same line testing operation by the boxes takes place irrespective of the number of boxes which have been pulled. If two boxes are pulled while a third is transmitting, the two later pulled boxes will both operate in non-interfering succession to the first pulled box and to each other, the first one of the later pulled boxes to detect completion of transmission by the first pulled box being the one to take over the line and transmit.

If, when a single box is pulled, there has been a line break anywhere in the loop, neither the non-interference magnets 46 and 54 nor the associated coil 50 of that box can be energized. As the box runs after it has been pulled with the magnet coil 50 not energized, the box will mechanically shift shunt bar 58 into contact with the contacts 60 and 62. This will establish a ground, and circuit connections to the central station through the unbroken half of the signal loop and through ground. When the switch 38 is shifted at the central station to ground the negative side of the power source 32 and connect the positive side of the power source 32 to both of its output terminals 34 and 36, the auxiliary circuit is complete. If a box is pulled which is located between a grounded transmitting box and the central station, it will operate non-interfering until the first pulled box completes its transmission and then establish its own ground. In the box of the present invention, the non-interference magnets 46 and 54 and their associated armature will operate in the cycles following the establishment of the ground substantially in the same manner as the above-described normal operation, that is, there will be a line testing period at the beginning of each cycle to determine whether any other box is transmitting in the auxiliary circuit. If another box is transmitting, the armature of the second pulled box will fall beyond the range of attraction of the non-interference coils 46 and 54 and remain there for substantially the remainder of that cycle and continue to line test at the beginning of each cycle until the first pulled box has completed signalling and then will take over and signal in the normal manner. The ground is automatically removed by each box when it shuts down at the end of its transmitting cycle. The foregoing generally described operation will become more fully apparent after reading the detailed description of the mechanical structure and operation of each box that follows.

Figure 1:
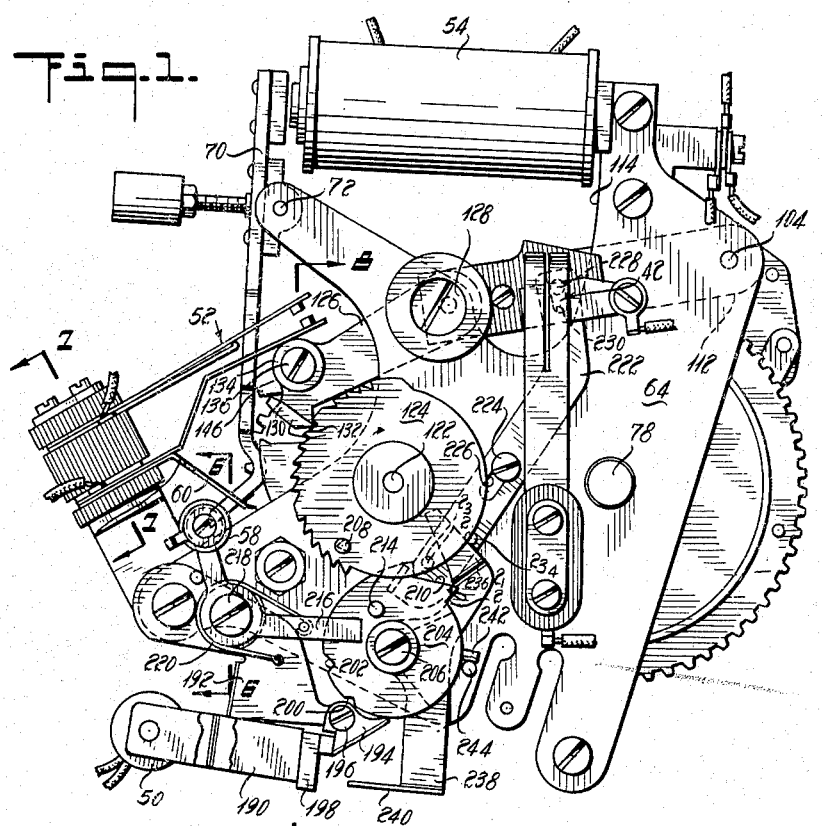
FIGURE 1 is a view in side elevation of a fire alarm signalling apparatus constituting one embodiment of the invention.
Figure 2:
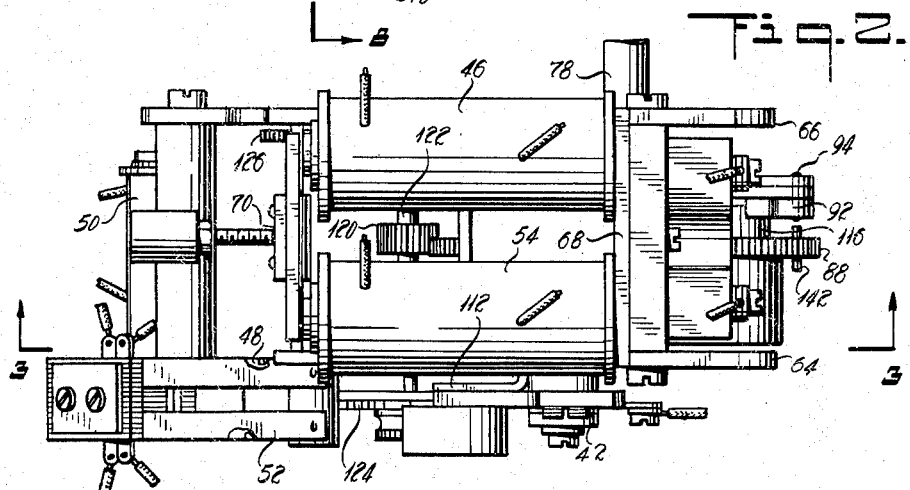
FIGURE 2 is a top plan view of the apparatus of FIGURE 1.

Referring to FIGURES 2 and 4, the various components of the signalling mechanism are mounted upon a framework consisting of a front plate 64 and a rear plate 66 rigidly interconnected in fixed parallel spaced relation as shown. The non-interference magnet coils 54 and 46 are fixed to an interconnecting yoke 68 at the top of the frame as shown in FIGURE 2. The non-interference armature 70 (FIGURES 1 and 2) is pivotally mounted upon a shaft 72 extending between and perpendicular to the plates 64 and 66. Mechanical power for driving the mechanism is provided by a spring motor 74 (FIGURE 4) which is manually wound by a key 76 fixed to a shaft 78 journalled upon the frame plates 64 and 66. Reverse rotation of shaft 78 is prevented by the engagement of a dog 80 pivotally mounted upon plate 66 by pivot stud 82 with a ratchet 84 fixed to the shaft 78. The output element of spring motor 74 comprises a drum 86 having an external gear 88 integral therewith. The rest position of the drum 86 (that is the position of drum 86 when the box is shut down) and gear 88 is determined by a dog clutch comprising a pair of diametrically spaced notches 90 formed in the drum 86 and a dog 92 pivotally mounted at 94 upon a lever 96 and biased by a spring 98 on lever 96 against a stop 100 on lever 96. The lever 96 is fixed to a tubular shaft 102 rotatably mounted upon a shaft 104, which extends between and perpendicular to the side plates 64 and 66 and is spring-biased in a clockwise direction about the axis of shafts 102 and 104 by a spring 106 extending between spring studs 108 and 110 fixed respectively to lever 96 and plate 66 as shown in FIGURE 4. An arm 112 is fixed to the opposite end of tubular shaft 102 and is bent to extend at its lefthand end as viewed in FIGURE 1 to a position in front of plate 64 through the notch 114 in plate 64. Arm 112 is the arm which is pulled down when the box is manually actuated to transmit an alarm. When the box is pulled, arm 112 is pivoted in a counterclockwise direction about the axis of shaft 104, tubular shaft 102 is rotated in a counterclockwise direction carrying lever 96 in a counterclockwise direction in opposition to the bias of spring 106 and disengages dog 92 from the notch 90 in which it is engaged. When the dog 92 is completely disengaged from the notch 90, the spring 98 forces dog 92 in a counterclockwise direction about the stud 94 upon which it is pivotally mounted to a position against stop 100 in which dog 92 lies above the periphery 116 (FIGURE 3) of the drum 86 adjacent notch 90 so that release of lever 112 will not reengage dog 92 in notch 90. When dog 92 is pulled from notch 90, gear 88 is free to rotate under the influence of the spring motor 74 at a rate determined by a conventional escapement (not shown). Dog 92 rides on the periphery 116 of drum 86 between notches 90 and thereby holds lever 96 and arm 112 in their counterclockwise positions as shown. The time which is required for drum 86 to rotate one-half revolution between the positions in which dog 92 can engage the two diametrically spaced notches 90 establishes the period of the basic cycle of this apparatus. If this box is pulled and no other box is operating and there is no line break, drum 86 will rotate 180° and the dog 92 will engage the next notch 90 and the mechanism will come to a stop. Referring to the timing chart (FIGURE 10), line 3 shows that the timing chart covers one-half revolution of the main gear 88. The first line shows that the box pull lever and arm 112 will be pulled down to initiate rotation of gear 88 and remains down in the normal or transmitting cycle until the dog 92 begins to enter the next succeeding notch 90 at the end of the half revolution of gear 88.

Referring again to FIGURES 1 and 3, gear 88 is in constant mesh with a pinion 120 fixed to a shaft 122 which is journalled between the spaced plates 64 and 66 and is perpendicular thereto. The code wheel 124 is fixed to the end of shaft 122 in front of the front plate 64 as shown in FIGURE 1. Fixed to the rear end of shaft 122 is a gear 125 adjacent rear plate 66. Gear 125 is connected through a gear train not shown to an escapement mechanism which through such gear train and gear 125 controls the rate of rotation of shaft 122 under the driving force imparted thereto from spring motor 74 through gears 88 and pinion 120. As is shown in line 4 of FIGURE 10, the code wheel 124 makes four revolutions for each half revolution of the main gear 88 in this embodiment of the invention. So long as there are a whole number of revolutions of the code wheel during a cycle, the specific number is not critical. The periphery of code wheel 124 is suitably notched to provide it with a coded notched periphery indicative of the particular box. That is, each box within a given loop will have a code wheel 124 having a distinct profile so that the signals generated under the control of each code wheel 124 in each box will be different. A code wheel rider 126 is pivotally mounted upon a shaft 128 extending between and perpendicular to the plates 64 and 66 as is best shown in FIGURES 1 and 3. Code wheel rider 126 has a forwardly extending projection 130 having a knife edge 132 adapted to engage and follow the contours of the saw tooth profile of the code wheel 124.

The code contacts 48 and 52 are mounted upon the frame member 64 and extend above an insulating bushing 134 fixed to code wheel rider 126 by a stud 136. When the code wheel rider 126 is in its lower position with the knife edge 132 seated in a notch in the peripheray of code wheel as illustrated in FIGURE 1, the contacts 52 and 48 are both open as shown in FIGURE 1. When the knife edge 132 is in engagement with a crest of one of the teeth on the code wheel 124, code wheel rider 126 is pivoted slightly in a clockwise direction about the axis of shaft 128 to lift the bushing 134 sufficiently to close the contacts 52 and 48. Line 5 of a timing diagram (FIGURE 10) shows the profile of a typical code cam (not the one illustrated in FIGURE 1) utilizing the knife edge 132 as a reference point. That is, the initial point on line 5 of the timing chart represents the point on the periphery of the code wheel 124 which is directly opposite knife edge 132 when the main gear 88 is at rest in one of its home positions. In the timing diagram (FIGURE 10), each revolution of the code wheel 124 has been divided into 40 steps and each step is quivalent to the spacing between adjacent notches on the profile of the code wheel 124.

Figure 5:
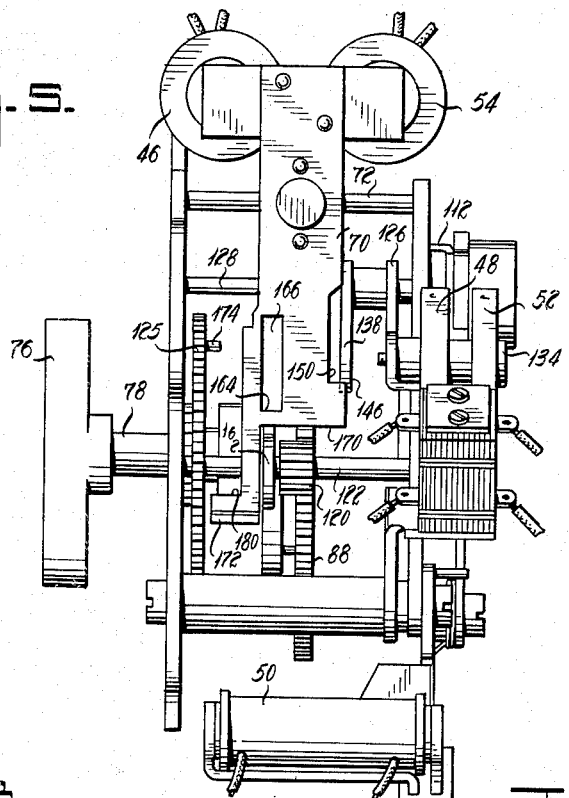
FIG. 5 is a view of the apparatus of FIG. 1 as seen from the left.

In the rest position of the mechanism, that is with dog 92 (FIGURE 3) seated in one of the notches 90, code wheel rider 126 is held upwardly in a clockwise direction about the axis of shaft 128 and with the contacts 48 and 52 closed. As stated previously, code wheel rider 126 (FIGURE 1) is fixed to shaft 128. Also fixed to shaft 128 to the rear of code wheel rider 126 is a member 138 which has a depending portion 140 disposed in the path of movement of a stud 142 mounted on gear 88 and extending parallel to the axis of rotation of gear 88, FIGS. 3 and 5. As is shown in FIGURE 3, there are two studs 142 on gear 88 spaced 180° apart. When gear 88 approaches its home position, one of the studs 142 engages the depending portion 140 of the member 138 to pivot member 138, shaft 128 and code wheel rider 126 in a clockwise direction about the axis of shaft 128. If the gear 88 is coming to rest, pin 142 will remain in engagement with the depending portion 140 at the rest position of gear 88. This is shown in line 20 of FIGURE 10. If gear 88 is merely moving through its rest position, stud 142 will engage portion 140 and lift member 138 and code wheel rider 126 but continue to move until it no longer engages the depending portion 140 and thus free code wheel rider 126 of its control.

As is shown in line 6 of FIGURE 10, during a transmitting cycle code wheel rider 126 is released to engage the periphery of the code wheel 124 at point three of the first revolution of the code wheel 124 and remains free to engage the periphery of code wheel 124 until point 36 of the fourth revolution of the code wheel 124. During either a non-interfering cycle or a no current cycle (a cycle in which a line break is detected and a ground established) the code wheel rider 126 is not allowed to contact the code wheel 124 and the code contacts 48 and 52 are held closed (see lines 7, 8, 10 and 11 of FIGURE 10).

As indicated by line 12 of timing chart of FIGURE 10, the main or non-interference coils 54 are energized in a transmitting cycle as soon as the shunt contact 42 is open by pulling down of the arms 112 and remain closed until the code wheel rider 126 has been released by stud 142 and the knife edge 132 has engaged the first notch of the code wheel profile which for the illustrative code wheel is at point 5 of the first revolution of the code wheel. Thereafter the main non-interference coils 46 and 54 are energized when contacts 48 and 52 are closed by the lifting of the code wheel rider 126 and deenergized when contacts 48 and 52 are opened by knife edge 132 dropping into a notch in the periphery of the code wheel 124.

The armature 70 associated with non-interference coils 46 and 54 is shown in FIGURES 1 and 3, in its position in which it is mechanically held within the field of influence of the magnetic field of coils 46 and 54 when energized. During a normal transmitting cycle, armature 70 is mechanically held in this position during the intervals when it is not attracted by the coils 46 and 54. The movement of main armatures 70 during a transmitting cycle is illustrated in line 15 of the timing diagram FIGURE 10. In line 15 the upper position indicates that the armature 70 is attracted, the lower position indicates that it is mechanically held within the range of influence of coils 46 and 54. Between transmitting contact closures, the mechanical support for armature 70 is provided by an end portion 146 (FIGURE 3) on the member 138 and a cooperating surface 148 on the depending portion of armature 70 beneath a notch 150 in the edge of armature 70 best shown in FIGURE 5. When the knife edge 132 on the code wheel rider 126 is in engagement with a notch, the portion 146 of member 138 is below the bottom of notch 150 so that the surface 148 of the armature 70 abuts the end of portion 146 as the armature 70 is released by coils 46 and 54 when they are deenergized, thus holding armature 70 in the position shown in FIGURE 3. As the knife edge 132 of the code wheel rider 126 rises into engagement with the crest of the teeth on the periphery of the code wheel 124, member 138 is pivoted in a clockwise direction as viewed in FIGURE 3, sufficiently so that the end portion 146 of member 138 is above the lower edge of notch 150. At those times, armature 70 must be held by the magnetic attraction of coils 46 and 54 or it will drop in a counterclockwise direction about its pivot 72 to a position in which it is no longer within the range of attraction of the coils 46 and 54 and will remain beyond that range until mechanically pushed back into that range as will be explained presently. When armature 70 drops to this position, end portion 146 of member 138 passes through notch 150. With armature 70 in this position, the contacts 48 and 52 are locked in their closed position due to the support of member 138 by the bottom of notch 150 and end portion 146.

As is shown in FIGURE 3, the lever 96 carrying the dog 92 extends between plates 66 and 64 toward the armature 70 and terminates in an arcaute end surface 162. When lever 96 is in its full clockwise position with dog 92 bottomed in one of the notches 90 (the rest position of the apparatus before the box is pulled and after it has shut down), surface 162 is in engagement with the bottom edge 164 of a through notch 166 (FIGURE 5) in the armature 70. When the box is pulled, lever 96 pivots in a counterclockwise direction sufficiently so that the top edge 168 of its end face 162 lies below the bottom surface 170 (FIGURE 5) on the armature 70. When lever 96 is first pivoted upon pulling of the box, armature 70 will shift slightly in a counterclockwise direction until its bottommost tail 172 engages a pin 174 on the gear 125 which, in the home position of the mechanism, is in position to be engaged by tail 172 substantially immediately upon release of armature 70 by surface 162. As is shown in line 18 of the timing chart, pin 174 only controls the position of armature 70 for the first step of the first revolution of the code wheel in each cycle and for the last step of the fourth revolution of the code wheel in each cycle. The reason for this, despite the fact that pin 174 makes one revolution with each revolution of the code wheel, will become apparent presently. Upon release of the armature 70 at the end of step 1 of the first revolution of the code wheel after pulling down of lever 96, the armature is testing for the existence of signalling by another box in the same loop. If no signalling by another box is occurring at this time, the armature 70 will be attracted by coils 46 and 54 because the code contacts 52 and 48 are held closed until point 4 of the first revolution of the code wheel 124, first by pin 142 on gear 88 and projection 140 of member 138 and then by the profile of code wheel 124. If another box is signalling, there will be an interruption in the current in coils 46 and 54 for at least a short interval between points 1 and 4 of the first revolution of the code wheel. If there has been a circuit break, no current will be flowing in coils 54 and 46 at all between points 1 and 4 of the first revolution of the code wheel. In either event the armature 70 will be free of magnetic support and also during this time interval is free of mechanical support so that it will fall to a position in which it is beyond the range of influence of coils 46 and 54. It will come to rest when its bottom edge 170 (FIGURE 3) engages a surface 176 on member 96 and will remain there throughout substantially the remainder of the half revolution of gear 88. Whenever armature 70 has dropped to this position, as the next notch 90 approaches the dog 92, dog 92 will tend slightly to enter that notch 90, thus imparting slight clockwise movement to lever 96 under the influence of spring 106 and bringing the surface 178 into engagement with the surface 170 on the bottom of armature 70. Due to the inclination of surface 178 on lever 96, this force will shift armature 70 slightly in the clockwise direction about its pivot shaft 72. The movement of armature 70 is sufficient to move the tail 172 back into the path of movement of the pin 174 on the gear 125. When the surface 170 is in abutment with the surface 176 on member 96, the end of the tail 172 of armature 70 lies radially inward of the path of movement of pin 174 with respect to axis of shaft 122 so that the pin 174 passes above the tail 172 through the cut-out portion 180 shown in FIGURE 5. For this reason, the end of revolutions 1, 2 and 3 of the code wheel, pin 174 will pass through the cut-out 180 and have no effect on the armature 70 but at the end of each fourth revolution of the code wheel, armature 70 will have been shifted by lever 96 to a position in which the pin 174 will engage the tail 172 of the armature 70. This is illustrated in line 18 of timing chart FIGURE 10. During the interval in which the surface 170 on the armature 70 is in engagement with the surface 178 on the lever 96 as just described, armature 70 will prevent further clockwise movement of lever 96 under the bias of spring 106 and permit dog 92 to ride up upon the profile 116 of the drum 86 beyond the notch 90 in which it tended to engage and the mechanism will thus continue to run for at least one further half revolution of the gear 88. This action takes place before pin 174 shifts the edge 170 past the top edge 168 of the end surface 162 of lever 96, that is before the end of the fourth revolution of the code wheel. By this mechanism, the armature 70 is mechanically placed within the range of attraction of coils 46 and 54 at the end of point 1 of the first revolution of the code wheel during each half revolution of the main gear 88. If between points 1 and 4 of the first revolution of the code wheel of each cycle there is a no current condition in the coils 46 and 54 due to a line break or a current interruption due to the signalling of another transmitter, the armature 70 will drop beyond the range of attraction of the coils 46 and 54 and remain there until the end of that cycle, at which time another test will be made. This testing operation will take place until a transmitting cycle of four revolutions of the code wheel has been accomplished. This arrangement assures non-interference succession operation over the normal loop circuit and also over an auxiliary established ground loop, as will be explained presently.

In the summary therefore the operation in a normal transmitting cycle is as follows: Arm 112 is pulled down manually. This opens box shunt contacts 42. Opening of shunt contacts 42 energizes coils 46 and 54 attracting armatures 70. Armature 70 remains attracted until the code wheel rider 126 drops into the first notch on the code wheel which in the illustrative code wheel is at point 4. Thereafter, as shown by lines 15 and 19 of FIGURE 10, the armature is either attracted due to current flowing in the main coils 46 and 54 or mechanically held by the end 148 of lever 138 until four points before the end of the fourth revolution of the code wheel at which point lever 138 is held by pin 142 until two points before the end of the fourth revolution of the code wheel at which point the arm 112 has reached the upper limit of its travel in which it is again effective to mechanically hold the armature 70 within the range of attraction of coils 46 and 54. In a non-interfering cycle the armature 70, being without mechanical support between points 1 and 4 of the first code wheel revolution, will drop from its attracted position at the first circuit break effected by the code contacts of the transmitting box that occurs between points 1 and 4 of the first revolution of the code wheel to its fully retracted position beyond the attraction range of coils 46 and 54 and will remain there until the end of the fourth revolution of the code wheel in that cycle in which it will be mechanically pushed into the attraction range of coils 46 and 54 where it will be mechanically held throughout point 1 of the first revolution of the code wheel of the next succeeding cycle to provide a further non-interference test of the line. If no other box is transmitting in the second cycle, the second cycle will be a transmitting cycle as described before. If any other box is still transmitting, the box in question will follow a non-interfering cycle again and will continue to follow non-interfering cycles until it does have continuous current in its coils 46 and 54 throughout points 2, 3 and 4 of the first revolution of its code wheel 124.

If, due to a line break, there is no current in the main coils 46 and 54 throughout points 2, 3 and 4 of the first code wheel revolution, the main armature will drop immediately to its retracted position as soon as released by pin 174 as is illustrated in line 17 of the timing chart. In such instance, during the first cycle the box will establish a ground as will be described presently. If a box is pulled which is in series with a second box more remote from the central station which has been previously pulled, established a ground and is transmitting, the later pulled box will have current in it when first pulled and will therefore operate through non-interfering cycles until the first pulled box shuts down. Referring again to FIGURE 9, assuming a circuit break occurs between box 40a and terminal 34 and that box 40a is pulled and then box 40 is pulled. Under these conditions, box 40a will operate through a first cycle, establish a ground and begin transmitting during its second cycle. The transmission during the second cycle of box 40a will energize coil 50 of box 40 and thereby prevent box 40 from establishing a ground which would interfere with the transmission of box 40a and box 40 will not be able to establish a ground until box 40a has completed its full transmission cycle and removed its ground. When box 40a has shut down, box 40 will go through a cycle in which it establishes a ground and then a cycle in which it transmits to the central station.

If box 40 is pulled and then box 40a is pulled, box 40 will go through its first cycle and establish a ground and then go through a transmitting cycle during its second cycle of operation remove its ground and shut down. Box 40a will establish a ground during its first cycle of operation and at the beginning of its second cycle test to determine if box 40 is still transmitting. If box 40 is still transmitting at the beginning of the second cycle of box 40a, box 40a's second cycle will be a non-interfering cycle and box 40a will continue to operate non-interfering until box 40 has completed its transmission and removed its ground. Box 40a's next succeeding cycle of operation will be a transmitting cycle. Each box always transmits a full cycle before it shuts down.

In the circuit of FIGURE 9, assuming no other box has been actuated and if a break has occurred in the series circuit between the opposite sides of the power source 32 either in the circuit between the boxes or internally of the actuated box, when a box is actuated by pulling it and opening the associated shunt contacts 42, no current will flow through the series loop circuit. Thus, the coils 46, 50 and 54 internally of the actuated box will remain deenergized. As has been explained, this is effective to establish a ground by moving shunt bar 58 into engagement with contacts 60 and 62. The mechanism by which this result is accomplished will now be described.

Figure 8:
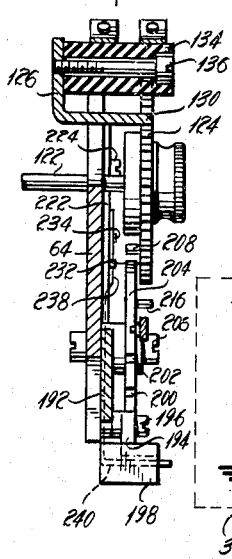
FIG. 8 is a section taken along the line 8—8 of FIG. 1.

Referring to FIGURE 1, magnet 50 is provided with a magnetic yoke structure 190 and is mounted on the front plate 64 through a bracket 192. A detent pawl 194 which is pivotally mounted on bracket 192 by pivot screw 196 has an armature 198 fixed thereto and disposed in the field of magnetic attraction of the magnetic field at the end of yoke 190. Armature 198 is shown in its attracted position in FIGURE 1. When coil 50 is deenergized, the weight of armature 198 gravity biases the detent 194 in a counterclockwise direction about its pivot 196. Detent 194 cooperates with a pair of notches 200 and 202 in the periphery of a detent wheel 204, which is mounted for oscillatory movement about a pivot screw 206. Detent wheel 204 is actuated by a pin 208 on the rear side of the code wheel 124 (see also FIGURE 8) which coacts with notches 210 and 212 also on the periphery of detent wheel 204. During each revolution of the code wheel 124, pin 208 engages either notch 210 or 212 and imparts sufficient angular movement to the detent wheel 204 to bring notch 200 into alignment with the edge of detent 194 or if detent 194 is already engaged in notch 200 pin 208 engages notch 212 sufficiently to advance notch 202 into alignment with detent 194. Thus, if magnet 50 remains deenergized during the first revolution of code wheel 124 after the box has been pulled to initiate operation as previously described, pin 208 will engage the end surface of notch 210 sufficiently to advance notch 200 into alignment with detent 194 and detent 194 due to the gravity bias of the associated armature 198 will engage in notch 200 and prevent reverse rotation of detent wheel 204. This operation is illustrated in line 23 of the timing diagram, FIGURE 10, as occurring at approximately point 8 of the first revolution of the code wheel 124. During the second revolution of the code wheel if magnet 50 has still not been energized pin 208 engages the end face of notch 212 and advances the detent wheel 204 so that notch 202 is in alignment with detent 194 and due to the gravity bias of detent 194 by armature 198 detent 194 will engage notch 202 and prevent reverse rotation of detent wheel 204. Detent wheel 204 carries a pin 214 projecting in an axial direction from the front face thereof which cooperates with a bell crank 216 pivoted about a pivot screw 218 on the bracket 192 and resiliently biased in a counterclockwise direction by a spring 220. At the upper end of bell crank 216 the grounding bar conductor 58 is mounted as shown. When detent wheel 204 is moved into its position in which detent 194 engages notch 202, bar 58 engages contact 60 and contact 62 which is immediately behind contact 60 and thus applies a ground to contacts 60 and 62 which are connected to magnet 50 and contacts 48 and 52 in the manner illustrated in the wiring diagram of FIGURE 9. This is illustrated in line 23 of the timing diagram FIGURE 10 as occurring at point 8 of the second revolution of the code wheel. It will be noted from FIGURE 9 that ground is applied to both sides of coil 50 so that the ground circuit will never include coil 50. After establishment of the ground at point 8 of the second code wheel revolution, the mechanism will continue to run for the remainder of the first half revolution of the main gear 88 (a no current cycle), and will continue to run through at least a second half revolution or cycle, which if no other box between the box in question and the central station has been pulled will be a normal transmitting cycle as previously described or which, if another box has been pulled, will be a non-interfering cycle as previously described. In other words, following the establishment of ground by the pulled box, the box will complete its first cycle and then operate in the normal non-interfering succession manner until it is able to go through a transmitting cycle of four revolutions of the code wheel and it will then shut down. Shutting down of the mechanism results in pivotal movement of lever 112 in a clockwise direction to its normal position as has been explained. Referring to FIGURE 1, associated with lever 112 is a slide bar 222 mounted upon the front plate 64 by a screw 224 extending through an elongated slot 226 therein and connected to lever 112 by a pin 228 engaging an elongated slot 230 in the slide bar 22. By this construction, when the lever 112 is restored to its upper limit position upon shutting down of the apparatus following completion of a transmitting cycle, slide bar 222 will be lifted. Slide bar 222 carries a pair of pins 232 and 234 which embrace the upwardly extending arm 236 of a bell crank 238 pivoted upon the pivot screw 206. In the shut-down position of the apparatus of FIGURE 1, pin 232 is lifted sufficiently to engage the arm 236 to pivot the bell crank 238 in a clockwise direction sufficiently to cause the extension 240 thereof to engage the armature 198 and pivot detent 194 from engagement with the notch 202 to release detent wheel 206 to return to its normal position as shown in which the stop lug 242 thereon abuts the stop pin 244 on the front plate 64 under the biasing force of the spring 220 acting through the arm of the bell crank 216 and pin 214. Thus when the mechanism is shut down the ground established by grounding bar 58 is removed so that this ground cannot interfere with any operation of another box.

*Second embodiment*

The second embodiment of this invention is mechanically identical with the first embodiment in all respects except for the detailed construction of the ground establishing mechanism which differs primarily from that of the first embodiment in that it utilizes the non-interference coils 54 and 46 not only to perform their normal non-interference function in controlling armature 70 but also to control a further armature which controls the actuation of the ground applying mechanism. Electrically the circuit may be the same as shown in FIGURE 9 except that coil 50 is eliminated and contacts 60 and 62 are merged into a single contact so that there is a direct electrical connection between contacts 48 and 52.

In the embodiment of FIGURES 11 and 14, the grounding bar or contact 58, which is associated with merged contacts 60–62, is mounted upon a lever 300 which is pivotally mounted upon the frame front plate 64 by a pivot screw 302 and resiliently biased in a clockwise direction by a spring 304. Lever 300 is restrained against clockwise rotation by latching engagement at 306 with a latch lever 308 pivotally mounted upon frame plate 64 by a pivot screw 310 and resiliently biased in a clockwise direction into latching engagement with lever 300 at 306 by the spring 304 which interconnects latch lever 308 with ground bar supporting lever 300. Counterclockwise movement of latch lever 308 will disengage the latch 306 and permit lever 300 to move in a clockwise direction to engage grounding bar 58 with the contacts 60–62 and electrically apply a ground to the connection between signalling contacts 48 and 52. The unlatching of latch lever 308 is controlled by a linkage comprising a detent lever 312 pivoted at 314 on the rear side of front plate 64, a detent 316 pivoted at 318 on the rear side of the front plate 64, an arm 320 fixed to the shaft 122 on which the code wheel 124 is fixed and a gravity biased armature 322 associated with the non-interference coils 46 and 54 and pivotally mounted upon the same shaft 72 as the main non-interference armature 70. Armature 322 is mechanically prevented from pivoting beyond the range of attraction of coils 48 and 52 at any time. The operation of this mechanism is as follows. During each first revolution of the code wheel 124 and its shaft 122 during each cycle of the mechanism, arm 320 will engage a notch 324 in the lower end of detent arm 312 and pivot arm 312 in a counterclockwise direction sufficiently to permit arm 326 of detent 316 to engage the notch 328 at the top of the detent lever 312. If coils 54 and 46 are energized at any time during the remainder of the first cycle, armature 322 will be attracted and pivot in a clockwise direction about shaft 92 to force its arm 330 against the top ear of the detent 316 to release detent arm 326 from notch 328 to permit lever 312 to restore to its original position in a clockwise direction under the biasing force of spring 332. If coils 46 and 54 have not been energized before arm 320 on the code wheel shaft 122 again reaches its topmost position, arm 320 will engage surface 334 on lever 312 and further pivot lever 312 in a counterclockwise direction to permit the arm 326 of detent 316 to engage the notch 336 on the lever 312. As lever 312 moves to this position, a pin 338 thereon engages surface 340 on latch lever 308 to pivot it in a counterclockwise direction in opposition to the biasing force of spring 304 to disengage the latch 306 to permit lever 300 to pivot in a clockwise direction under the biasing force of spring 304 to shift the grounding bar 58 into grounding contact with the contact 60–62. Armature 322 unlike armature 70 at all times is held within the field of magnetic attraction of the coils 46 and 54. Once the ground has been established by this mechanism, the apparatus will proceed to finish its grounding cycle, which will be followed by a transmitting cycle or by one or more non-interfering cycles and a transmitting cycle as in the previous embodiment. In either event, upon the completion of the transmission cycle when lever 112 is restored in a clockwise direction, it will abut the end of arm 342 of lever 300 and pivot lever 300 in a counterclockwise direction to disengage grounding bar 58 from the contacts 60–62 thus removing the ground and in so doing latch 306 is again established in its operative position to prevent reestablishment of the ground prior to a future grounding or no current cycle. From the foregoing it is apparent that in neither the first nor second embodiments is the normal operation of the armature 70 interfered with by the grounding mechanism with the result that the apparatus operates in its normal non-interfering succession manner over both the normal and auxiliary circuits.

*Third embodiment*

FIGURE 15 illustrates an embodiment of this invention which is adapted for remote actuation by a fire alarm in a private line such as in a building and which is adapted to modify the signal transmitted if the actuation of the box is the result of a circuit difficulty in the private line rather than a true fire alarm. The apparatus of FIGURE 15 modifies a normal transmitting cycle of four revolutions of the code wheel in the event of trouble in the auxiliary circuit rather than a true fire alarm so that the box will transmit a signal only during the first revolution of the code wheel and no signal during the remaining three revolutions of the code wheel and will then shut down. The mechanism is substantially identical with that of the embodiment of FIGURES 10 through 13 so that the box operates non-interfering succession and is self-grounding as in the second embodiment. The electrical circuit of the apparatus of FIGURE 15 and its relationship to the municipal loop circuit is shown in FIGURE 16, which is generally similar to the circuit of FIGURE 9 but shows the consolidation of contacts 60 and 62 into but a single mechanically operated contact 58 bridging 60 and 62 as the result of the elimination of the coil 50. The apparatus of FIGURE 15 is provided with a three pole switch 400 which is normally open and a single pole switch 402 which is open so long as the box is shut down but is connected with the lever 112 so that it closes as soon as the box is pulled and the lever 112 moved in a counterclockwise direction. The apparatus of FIGURE 15 is provided with a mechanism which will close three pole switch 400 at the end of the first revolution of the code wheel 124 in a transmitting cycle. The closing of switch 400 applies ground between contact 48 and coil 46 and between contact 52 and coil 54 and is thus effective to effectively eliminate transmitting contacts 48 and 52 from the circuit so that during the second, third and fourth revolutions of the code wheel 124 the contacts 48 and 52 will not transmit any signal to the central station. Switch 400 is closed only when the box of FIGURE 15 is actuated as a result of circuit difficulties in the private system and is not closed when a true fire alarm signal is transmitted in the private circuit.

A suitable circuit for detecting the difference between a true fire alarm and a circuit difficulty is illustrated in FIGURE 17. It is to be understood that the invention is not limited to this particular circuit. This circuit comprises a pair of relays 404 and 406. Relay 404 is normally deenergized and is energized normally when a fire alarm signal is transmitted in the private system in the conventional manner. Relay 406 is normally energized, being connected to the private system so that so long as current is on the private system and no circuit difficulty exists it will remain energized. One of its connections to the private system is through contacts 404a1 (normally closed) of relay 404. Thus when relay 404 is energized by a fire alarm signal in the private system relay 406 will be deenergized. The actuation of the apparatus of FIGURE 15 is controlled by a solenoid 408 (see FIGURES 15 and 17). Solenoid 408 is normally energized by a circuit from terminal 410 of a suitable power source such as the 120 volt 60 cycle power source indicated through the coil of solenoid 408, through the contacts 406b of relay 406 which are closed so long as relay 406 is energized and through the coil of a further solenoid 412, the purpose of which will be explained presently, to the opposite terminal 414 of the A.C. power source. The normally open contacts 404a of relay 404 are connected in parallel with solenoid 408 and contacts 406b of relay 406. So long as contacts 404a are open, solenoids 408 and 412 are energized. If a fire alarm signal is transmitted in the private circuit, relay 404 will be energized closing contacts 404a and shorting out contacts 406b and solenoid 408. Solenoid 408 will therefore be deenergized and solenoid 412 will remain energized. Referring to FIGURE 15, solenoid 408 forms a latch in its energized position for an actuating mechanism 416 for the apparatus of FIGURE 15. This actuating mechanism is a separate detachably mounted unitary subassembly and comprises a base structure 418 suitably mounted in fixed relation upon the top of the frame structure formed by plates 64 and 66, a shaft 420 having a manually actuatable turnkey 422 fixed to one end thereof and which is journalled upon spaced bearing supports 424 mounted on the base structure 418. Shaft 420 is resiliently biased in a clockwise direction by a torsion spring (not shown) surrounding shaft 420 and is provided with a first radially extending pin 426 which abuts an end plate 428 fixed to the core 430 of the solenoid 408 when the solenoid 408 is energized. Core 430 and pin 426 coact when the solenoid 408 is energized to prevent shaft 420 from rotating in a clockwise direction under the biasing force exerted upon it by the torsion spring previously referred to. When the solenoid 408 becomes deenergized, the core 430 is forced to the left by pin 426 sufficiently to permit the end of pin 426 to rotate past end plate 428 so that the shaft 420 is free to rotate in a clockwise direction under the biasing force of the torsion spring. An actuating pin 432 is fixed to shaft 420 and projects radially therefrom as shown. This pin 432 is of sufficient length so that, as shaft 420 rotates, it engages the internally extending end portion 433 of an upwardly extending arm 434 fixed to the lever 112 of the apparatus and pivot lever 112 in a counterclockwise direction. Lever 112, it will be recalled, is the lever which is normally pulled manually to actuate the box. Thus deenergization of solenoid 408 will release pin 426, permit shaft 420 to rotate in a clockwise direction so that pin 432 strikes the arm 434 pivoting lever 112 in a counterclockwise direction about the axis of shaft 104 upon which it is mounted and thus actuate the box. Upon actuation of the box in this manner, it operates in the same manner as has been described in connection with the previous embodiments when the box is manually actuated. Referring again to FIGURE 17, if there is a circuit interruption or other power loss in the private fire alarm circuit, both relays 404 and 406 will be deenergized. This will open contacts 406b of relay 406 and thus both solenoids 408 and 412 will be deenergized. Deenergization of solenoid 408 will result in actuation of the box as has just been described. Deenergization of solenoid 412 will result in actuation of a mechanism which is effective to close switch 400 (FIGURE 16) at the end of the first revolution of the code wheel in the transmitting cycle of the apparatus of FIGURE 15. This mechanism does not interfere with the normal non-interfering succession operation of the apparatus of FIGURE 15 or its auxiliary circuit ground establishing operation.

Thus, in reference to FIGURE 16, if a circuit break occurs in the private alarm system and also between boxes 40 and 40b, and box 40a had been previously actuated, box 40 would operate through a self-grounding cycle and thereafter operate non-interfering until box 40a had completed its transmitting cycle. Then box 40 would operate through a transmitting cycle in which it transmits a signal during only the first revolution of the code wheel 424.

The mechanism by which this is achieved will now be described in reference to FIGURE 15, and FIGURES 18–24. Referring first to FIGURES 15 and 18, solenoid 412 controls the operation of a double pivoted lever 450. Lever 450 is directly pivoted upon a pivot screw 452 which is mounted upon a member 454 which, in turn, is pivoted upon a shaft 456 extending at right angles to the axis of the pivot screw 452. Member 450 is biased by a spring 457 in a counterclockwise direction about screw 452 as viewed in FIGURE 18, and in a counterclockwise direction about the axis of pivot 456 as viewed in FIGURE 15. It is restrained from counterclockwise movement about 456 as viewed in FIGURE 15 by a surface 458 upon the member 460. It is restrained from counterclockwise movement as viewed in FIGURE 18 about pivot screw 452 by an upwardly extending ear 462 fixed to the core 464 of solenoid 412 so long as solenoid 412 is energized. Due to its orientation the core 464 of solenoid 412 is gravity biased downwardly. Upon deenergization of solenoid 412, core 464 will drop to its lower position and move the latch 462 from its position of restraint upon the member 450, allowing member 450 to pivot in a counterclockwise direction about the screw 452 as viewed in FIGURE 18. Member 450 shifts by this movement until its upwardly extending arm 466 abuts a depending portion 468 fixed to the projection 130 on the code wheel rider 126 as shown in FIGURE 19. Further movement of member 450 is prevented until the projection 130 of the code wheel rider 126 drops into the first notch on the code wheel 124. Since this will not occur until the beginning of the first transmission cycle of the mechanism, the member 450 remains in the position illustrated in FIGURE 19 throughout any non-interfering cycle and throughout any self-grounding cycle. When the projection 130 drops into the first notch in the code wheel 124 as is shown in FIGURE 20, the depending portion 468 is moved from behind the upwardly extending arm 466 of the member 450 and the member 450 can further pivot in a counterclockwise direction about the screw 452 until its lower end 472 engages an upstanding portion 474 on the member 460. This position is shown in FIGURE 21. When member 450 is in the position shown in FIGURE 21, its arm 476 has been pivoted sufficiently close to the front face of code wheel 124 that its surface 478 lies in the path of movement of the pin 480 projecting from the front face of the code wheel 124. As the code wheel 124 rotates through its first revolution in a transmitting cycle, pin 480 (FIGURE 20) will engage cam surface 478 and pivot member 450 with member 454 in a clockwise direction about the pivot stud 456 to the position shown in FIGURE 22. In this position, the end 472 of member 450 is raised over a latch surface 482 (see FIGURE 21), to move to the position shown in FIGURES 22 and 23 in which it is latched until manually released and restored. When member 450 is in the position shown in FIGURE 22, its arm 476 has been forced down between the blades of switch 400 as shown in FIGURE 24 thus connecting all three contacts thereof to ground through a circuit as shown in FIGURE 16.

*Automatic central station circuit*

As has been previously explained, due to the deficiencies of prior automatic grounding central office circuits heretofore it is normally necessary to apply the ground at the central station manually in the event of a break in a municipal box circuit loop by throwing a switch such as switch 38 in FIGURE 9. FIGURE 25 shows a novel and improved central office circuit adapted to control two municipal box loop circuits designated 1 and 2, to automatically establish an auxiliary circuit when a circuit break occurs in the normal loop and to re-connect the normal loop circuit semiautomatically when the circuit break is repaired. These central office circuits are independent but identical and the description of the operation of one will suffice. Under normal circuit conditions in loop circuit 1 for example, relay H is used to control the actuation of the gong and the recorder. Relay H is normally energized and becomes deenergized when the signalling contacts of a sending box in its circuit are open so that relay H during a normal signalling operation is energized and deenergized in accordance with the signal represented by the notches in the code wheel of the signalling box. If a circuit interruption in the loop 1 occurs, the circuit associated therewith is automatically operative to connect both sides of the loop to one side of the power source and establish a ground. In that event, either relay R1 or R2 is utilized to record an incoming alarm signal depending upon in which half of the broken loop the signalling box is located. Relays H and R1, R2 and R3 are all normal relays. Relays A and S are time-delay relays having slow make quick break actuations.

In the normal state in loop No. 1 with no circuit break and no box in operation, current flow is from the positive side of the battery through the normally closed relay contacts A1, the coil of relay H to terminal 34, through the loop circuit back to terminal 36 through the normally closed contacts A2 and A3 in series to the negative side of the battery. By this circuit H is maintained energized.

Under normal circuit conditions with no circuit interruption, but with one of the boxes in loop circuit No. 1 pulled, current flows in the circuit described above with the exception that each time the line between terminals 34 and 36 is broken by the opening of the transmitter contacts in the signalling box when the code wheel rider drops in a tooth in the code wheel, relay H is deenergized causing its contacts H1, H2 and H3 to be made on the lower contacts. This condition allows current to flow from the positive side of the battery through the coil of relay A, the lower contact of H1 back to the negative side of the battery but since relay A is a time-delay relay and the break interval in which relay H is deenergized is not sufficient, relay A is not energized. The recorder is connected at one side to the negative side of the battery. The other terminal of the recorder is connected through the normally closed contacts R3(2), the lower contacts H2 to the positive side of the battery each time that relay H is deenergized. One side of the gong control relay is connected to the negative side of the battery. The other side of the gong control relay is connected to the positive side of the battery through the lower contacts H3 each time relay H is deenergized. These circuits thus actuate the gong and the recorder whenever an incoming signal is received by relay H.

If a break occurs in the loop circuit No. 1, there is no external circuit between terminals 34 and 36 so that relay H is deenergized and its contacts H1, H2 and H3 are made on the lower contacts. Under this condition, current flows from the positive side of the battery through the coil of relay A, the lower contacts H1 back to the negative side of the battery. Since the time break interval in which relay H is deeneregized due to a circuit interruption is sufficient, relay coil A is energized and its contacts A1, A2 and A3 will be transferred to the upper contacts. Until a signalling box is pulled, the system will remain in this condition. With relay A energized, there is a connection from the positive side of the battery through the coil of relay R2, through the transferred contacts A2 to terminal 36 and a further circuit from the positive side of the battery through the transferred contacts A1 and the coil of relay R1 to the terminal 34. The negative side of the battery is connected through the transferred contacts A3 through the coil R3 to ground.

With the central office circuit in this condition, when a single box is pulled which is between the break and terminal 34, a ground will be applied by the pulled box during the second revolution of the code wheel in its first cycle of operation. When this ground is applied current will flow from the positive side of the battery through the transferred contacts A1, through relay coil R1 out through terminal 34, through one of the coils 46 or 54, one of the contacts 48 or 52, and the contact 58 of the pulled box to ground, through ground and the coil of relay R3, the transferred contacts A3 to the negative side of the battery, thus energizing relays R1 and R3. During the subsequent cycle of the pulled box which will normally be a transmitting cycle, relays R1 and R3 will be deenergized each time that transmitting contacts of the pulled box are opened as determined by the notches and the periphery of the code wheel. The contacts R3(2) will actuate the recorder and the contacts R3(3) will through a circuit through the lower contacts H3 actuate the gong relay and the trouble buzzer.

If the municipal loop box circuit No. 1 is broken between terminal 34 and the pulled box, the operation will be the same as described above except that current will flow from the positive side of the battery through relay coil R2, the transferred contacts A2 out through terminal 36 through the transmitter to ground then through relay R3 and the transferred contacts A3 to the negative side of the battery. Thus in this condition relays R2 and R3 will be energized when the ground is established by the transmitting box and they will be deenergized during the transmitting cycle of that box when the transmitting contacts thereof are opened as determined by its code wheel.

This circuit is designed to automatically restore itself to its normal condition after the break in the line has been repaired. In order for this restoration to be effected, it is necessary for a ground to be thrown on the external circuit loop either by pulling one of the boxes or by applying a ground deliberately anywhere on the line. When such a ground is applied, current will flow from the positive side of the battery through the transferred contacts A1, relay coil R1 to the line through terminal 34 through ground through the coil of relay R3, the transferred contacts A3 to the negative side of the battery. Current will also flow through a relay coil R2, the transferred points A2 through terminal 36 to the ground through relay coil R3 the transferred points A3 to the negative side of the battery. As can be seen, under these conditions relays R1, R2 and R3 are all energized and their contacts R1(1), R2(1) and R3(1) are all transferred to their upper position. This allows current to flow from the positive side of the battery through the No. 1 contacts of relays R1, R2 and R3, the coil of relay S to the negative side of the battery. Relay S will be energized when sufficient time has elapsed pulling up its contacts S1 and S2 on their upper contact points. Current will then flow from the positive side of the battery through the upper points S2, relay coil H, upper points S1 to the negative side of the battery. As soon as relay coil H is energized contacts H1 will open the circuit through relay A restoring the entire circuit to its normal condition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Fire alarm apparatus operative to maintain non-interfering succession over both a primary transmission channel and a self-established normally disconnected auxiliary transmission channel comprising a cyclically operative coding device operative for producing in each cycle of its operation a series of a predetermined number of successive signal groups, a first means operative at the beginning of each cycle of said coding device for testing the primary transmission channel for a no-current condition and means operative in response to any no-current condition during a cycle of said coding device other than a no-current condition produced by said coding device for rendering said coding device ineffective for signal transmission for the remainder of said cycle, a second and continuously operative electro responsive means for testing the line for a no-current condition and operative in response to a no-current condition of a predetermined duration greater than the period of circuit intterruption produced by said coding device for establishing an auxiliary transmission channel under control of said coding device without interfering with the control of said coding device effected by said first means whereby, in the event of actuation of said first means during a given cycle, signal transmission by said coding device is suspended for said given cycle, in the event of actuation of both said first and said second means during any given cycle or series of cycles, signal transmission by said coding device and establishment of said auxiliary transmission channel are suspended during each such given cycle and said auxiliary transmission channel is established prior to the first signal of the first group of the series in the cycle of said coding device following the last of such given cycles and the signal transmission during each cycle following the last of such given cycles is subject to the control of said first means, and means operative in response to completion of a predetermined number of cycles of signal transmission by said coding device for terminating operation of said coding device and of said first and second means and for disestablishing any auxiliary circuit established by said second means.

2. The fire alarm apparatus defined in claim 1 further comprising a pair of terminals connected respectively to two sides of a signaling loop; said coding device comprising two sets of contacts arranged in series, actuating means for alternately opening and closing the contacts of said sets, and a starting lever for said actuating means movable between a stop position and a start position; said second means including means to ground the intermediate contacts of said two series connected sets for an emergency connection to a central station rendered effective upon failure of the circuit through the two sides of said loop and said sets of contacts; said third means including means effective upon return of said starting lever to stop position to render the grounding means ineffective; said first and second means together providing means for controlling the operation of said actuating means and said grounding means to prevent actuation of either said actuating means or said grounding means when said apparatus is connected in either a normal signaling loop or an emergency connection which is in active signaling use.

3. The apparatus defined in claim 2 wherein said last named means comprises electromagnets energized by closing of said contacts and comprising two with coils connected respectively to the terminals of said pair and at their other ends to the end contacts of said sets arranged in series and an armature cooperating with said two electromagnets.

4. Signaling apparatus according to claim 3 wherein said actuating means includes a code wheel, and said grounding means includes an actuating dog fixed with respect to said code wheel and rotatable therewith, a toothed ratchet member carried by a pivot parallel to the axis of said code wheel engages by said dog and advances a one-tooth distance at a revolution of said code wheel, detent means on said ratchet member, a detent pawl to engage said detent means, and means to render said detent pawl ineffective when said electromagnets are energized, and means effective for operating said grounding means upon actuation of said ratchet member a plurality of times in succession while said detent pawl is effective.

5. Signaling means according to claim 3 wherein said grounding means comprises means for rendering it effective by energization of one of said electromagnets.

6. Signaling apparatus according to claim 3 wherein said grounding means for said intermediate contacts comprises means operated by energization of said two magnets for rendering grounding means ineffective.

7. Signaling apparatus according to claim 3 wherein said grounding means for said intermediate contacts comprises an auxiliary armature movable by energization of said two magnets and means rendered effective by such movement to render the grounding means ineffective.

8. Signaling apparatus according to claim 2 wherein said means for grounding said intermediate contacts comprises a grounding member connected to ground and including a part to bridge across said intermediate contacts, and means to move said grounding member to bridging position.

9. Signaling apparatus according to claim 2 wherein said grounding means comprises a grounding lever spring-urged to place one of its two arms into electrical connection with said intermediate contacts, a pivoted latch spring-urged to position to hold said lever in in ineffective position, means rendered effective upon failure of the circuit to release said grounding lever from said latch, and means effective upon return of said starting lever to normal position to engage the second arm of said grounding lever and return said lever to control by said latch.

10. Signaling apparatus according to claim 9 wherein said actuating means includes a code wheel and a member rotatable therewith, and said latch releasing means includes a pivoted ratchet member having a predetermined plurality of teeth for engagement by said member rotatable with said code wheel in the same plurality of successive rotations of the code wheel, spring means urging said ratchet means to normal position against a stop, detent means at another part of said ratchet member to hold the same in operated position including a spring urged detent pawl on a fixed pivot and cooperating means on said ratchet member, and means operated upon closing the circuit to move said pawl to ineffective position, said ratchet member being effective to release said latch upon two operations while the pawl is free.

11. Signaling apparatus comprising a pair of terminals connected respectively to two sides of a signaling loop, two sets of contacts arranged in series, actuating means for alternately opening and closing the contacts of said sets, a starting lever for said actuating means movable between a stop position and a start position, means to ground the intermediate contacts of said two series connected sets for an emergency connection to a central station rendered effective upon failure of the circuit through the two sides of said loop and said sets of contacts, means effective upon return of said starting lever to stop position to render the grounding means ineffective, and means for controlling the operation of said actuating means and said grounding means to prevent actuation thereof when either the signaling loop or the emergency connection in which said signaling apparatus is connected is in use, said last named means comprising electromagnets energized by closing of said contacts and comprising two coils connected respectively to the terminals of said pair and at their other ends to the end contacts of said sets arranged in series and an armature cooperating with said two electromagnets, said actuating means including a code wheel, and said grounding means including an actuating dog fixed with respect to said code wheel and rotatable therewith, a toothed ratchet member carried by a pivot parallel to the axis of said code wheel engaged by said dog and advanced a one tooth distance at a revolution of said code wheel, detent means on said ratchet member, a detent pawl to engage said detent means, and means to render said detent pawl ineffective when said electromagnets are energized, and means effective for operating said grounding means upon actuation of said ratchet member a plurality of times in succession while said detent pawl is effective, said means for operating said grounding means comprising a ground lever spring pressed to an ineffective position, a pin on said ratchet member in position to engage said lever and shift it against the action of said spring which, upon retraction of said detent pawl, will act to return the ground lever to its normal position.

12. Signaling apparatus according to claim 11 wherein said detent pawl is mounted on a pivot and has an armature thereon to overbalance said detent pawl and urge it into effective engagement with said ratchet member, said armature constituting part of means for retracting said detent pawl.

13. Signaling apparatus according to claim 12 wherein the armature on said detent pawl is moved to render the pawl ineffective by energizing said electromagnets.

14. Signaling apparatus according to claim 13 wherein the means for breaking the ground connection by return of the starting lever to its shutdown position comprises means for holding said armature-carrying pawl in retracted position.

15. Signaling apparatus according to claim 14 wherein said pawl associated with the ratchet member is locked in ineffective position when the starting lever is raised, by means including a lever with one arm having a portion to engage under said armature on the detent pawl and an operating arm and a link connected at its upper end to said starting lever and having at its lower part pins on opposite sides of the operating arm of said lever to shift said lever and render the armature carrying pawl ineffective.

16. Signaling apparatus comprising a pair of terminals connected respectively to two sides of a signaling loop, two sets of contacts arranged in series, actuating means for alternately opening and closing the contacts of said sets, a starting lever for said actuating means movable between a stop position and a start position, means to ground the intermediate contacts of said two series connected sets for an emergency connection to a central station rendered effective upon failure of the circuit through the two sides of said loop and said sets of contacts, means effective upon return of said starting lever to stop position to render the grounding means ineffective, and means for controlling the operation of said actuating means and said grounding means to prevent actuation thereof when either the signaling loop or the emergency connection in which said signaling apparatus is connected is in use, said means for grounding said intermediate contacts comprising a line connected said intermediate contacts and containing an electromagnet acting when energized to prevent grounding, a grounding member to bridge said intermediate contacts, and means to move said grounding member to bridging position.

References Cited by the Examiner

UNITED STATES PATENTS

| | | | |
|---|---|---|---|
| 1,058,728 | 4/13 | Cole | 340—295 |
| 1,210,398 | 1/17 | Beach | 340—295 |
| 1,215,515 | 2/17 | Gaskill | 340—295 |
| 1,244,587 | 10/17 | Cole | 340—295 |
| 1,484,713 | 2/24 | Johnson | 340—295 |
| 1,577,634 | 3/26 | Detmers | 340—295 |
| 1,999,859 | 4/35 | Beach | 340—295 |
| 2,034,017 | 3/36 | Beach | 340—292 |
| 2,137,760 | 11/38 | McCarthy | 340—292 |
| 2,149,572 | 3/39 | Beach | 340—295 |
| 2,171,751 | 9/39 | Jackel | 340—147 |
| 2,210,620 | 8/40 | Horni | 340—295 |
| 2,259,960 | 10/41 | Muehter | 340—295 |
| 2,270,925 | 1/42 | Bridges | 340—295 |
| 2,287,816 | 6/42 | Muehter | 340—292 |
| 2,365,719 | 12/44 | Muehter | 340—292 |
| 2,936,442 | 5/60 | Christman et al. | 340—147 |

NEIL C. READ, *Primary Examiner.*

IRVING L. SRAGOW, ROBERT H. ROSE, *Examiners.*

UNITED STATES PATENT OFFICE
CERTIFICATE OF CORRECTION

Patent No. 3,214,748

October 26, 1965

Donald J. Brown

It is hereby certified that error appears in the above numbered patent requiring correction and that the said Letters Patent should read as corrected below.

Column 3, lines 45 and 46, for "noninterfering" read -- non-interferring --; column 4, line 9, for "mechanical" read -- municipal --; line 20, for "of" read -- or --; line 22, for "throuthout" read -- throughout --; same column 4, line 30, for "the", second occurrence, read -- that --; column 12, line 28, for "22" read -- 222 --; column 16, line 19, for "throngh" read -- through --; column 18, line 56, for "intterruption" read -- interruption --; line 63, after "cycle," insert -- and, --; column 19, lines 37 and 38, for "advances" read -- advanced --; line 69, strike out "in", first occurrence; column 21, line 22, for "connected" read -- connecting --.

Signed and sealed this 16th day of August 1966.

(SEAL)
Attest:

ERNEST W. SWIDER
Attesting Officer

EDWARD J. BRENNER
Commissioner of Patents